United States Patent [19]
Willetts

[11] 4,385,857
[45] May 31, 1983

[54] INTERMODAL TRANSPORT SYSTEM

[76] Inventor: Elwood H. Willetts, 102 S. Penataquit Ave., Bay Shore, N.Y. 11706

[21] Appl. No.: 227,556

[22] Filed: Jan. 23, 1981

Related U.S. Application Data

[63] Continuation-in-part of Ser. No. 32,867, Apr. 24, 1979, abandoned, Ser. No. 72,072, Sep. 4, 1979, abandoned, and Ser. No. 143,354, Apr. 14, 1980, abandoned.

[51] Int. Cl.³ .......................... B61D 3/12; B61F 3/14; B61F 5/26; B61F 5/50
[52] U.S. Cl. ..................................... 410/53; 105/159; 105/224.1; 267/3; 410/45
[58] Field of Search ............... 104/32 A, 32 R; 105/3, 105/4 R, 4 A, 159, 182 R, 200, 215 C, 224.1; 267/3, 52, 57.1 R; 280/679, 681, 684, 687, 688, 712; 410/53, 54, 68, 453; 414/341, 342

[56] References Cited

U.S. PATENT DOCUMENTS

| 1,571,029 | 1/1926 | Waters | 104/32 R |
|---|---|---|---|
| 1,803,594 | 5/1931 | Brownyer | 105/182 R |
| 1,835,859 | 12/1931 | French | 414/342 |
| 1,990,538 | 2/1935 | Fildes | 414/342 X |
| 2,036,535 | 4/1936 | Nelson | 105/4 R X |
| 2,263,578 | 11/1941 | Hickman | 105/215 C |
| 2,480,211 | 8/1949 | Avila | 280/681 |
| 2,709,969 | 6/1955 | Andert | 105/215 C X |
| 2,787,971 | 4/1957 | Obes | 105/215 C |
| 2,896,548 | 7/1959 | Obes | 414/341 X |
| 2,963,986 | 12/1960 | Dobson | 105/159 X |
| 3,153,489 | 10/1964 | Leavengood et al. | 105/159 X |
| 3,171,668 | 3/1965 | Willetts | 267/57.1 R |
| 3,473,797 | 10/1969 | Selzer | 280/684 X |
| 3,572,745 | 3/1971 | Willetts | 280/687 |
| 3,771,465 | 11/1973 | Glenn | 105/200 X |
| 3,777,672 | 12/1973 | Schneider | 267/3 X |
| 3,856,325 | 12/1974 | Willetts | 267/52 X |
| 3,895,586 | 7/1975 | Willetts | 267/3 X |
| 3,961,582 | 6/1976 | Paton et al. | 105/224.1 X |

FOREIGN PATENT DOCUMENTS 947744 1/1964 United Kingdom ................ 280/679

Primary Examiner—Bruce H. Stoner, Jr.
Assistant Examiner—Howard Beltran
Attorney, Agent, or Firm—Paul J. Sutton

[57] ABSTRACT

The present invention teaches an intermodal rail-highway transport system for trailer-containers, in which unequalled economy measured in tons per mile per hour per dollar is achieved. Damage-free shipments with reduced loads per axle and unrestricted main line clearances through tunnels are facilitated with a system that utilizes an integral universal system interchange where trailer-containers, whose adjacent ends are supported torsion-free for linehaul via upstanding kingpins integral with centerplates suspended in tandem axle rail support trucks, are assembled into or broken from train-formation configurations by means of elevating shuttle means described in detail below.

1 Claim, 8 Drawing Figures

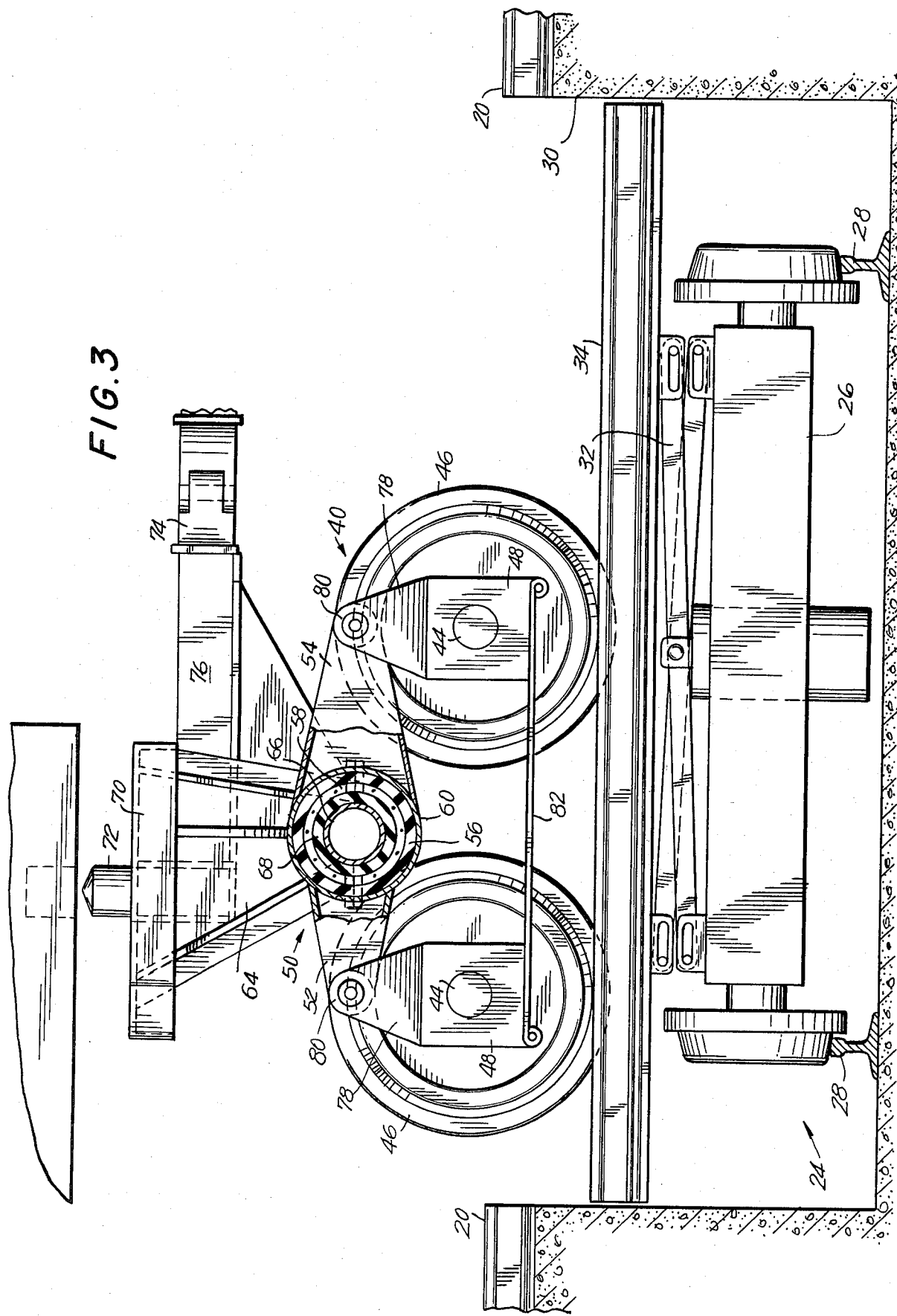

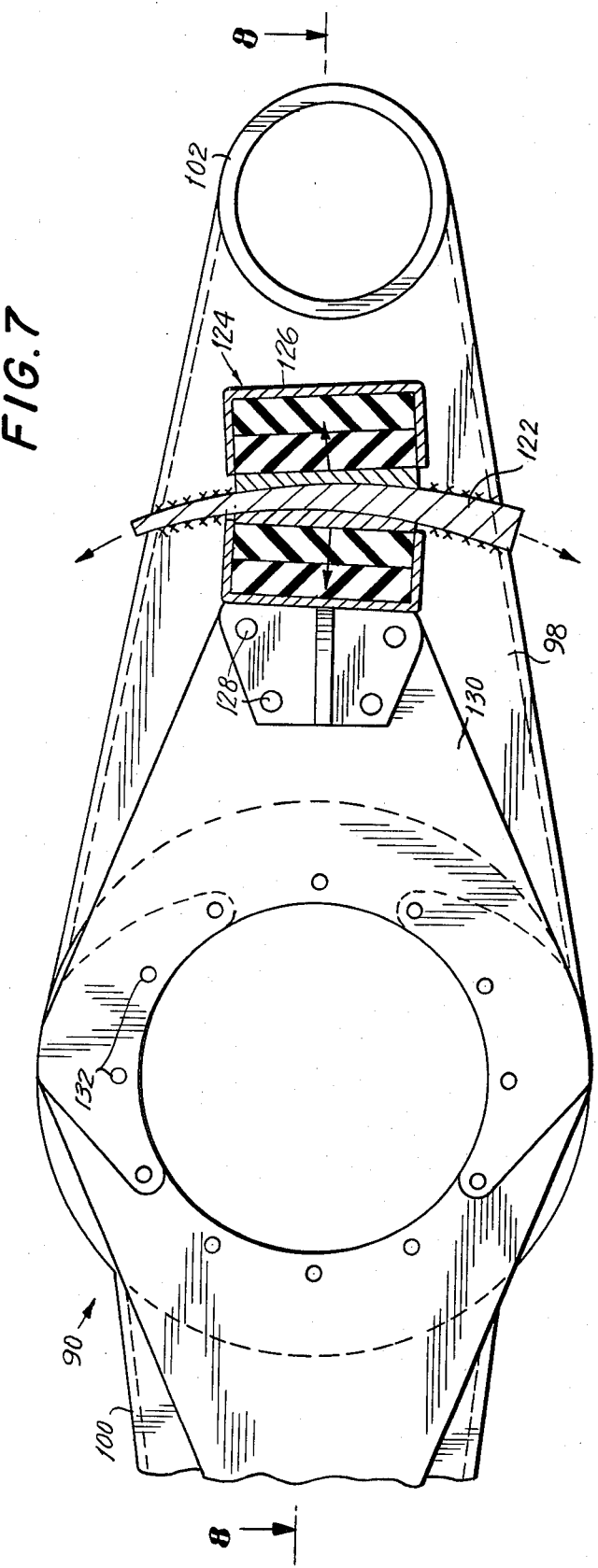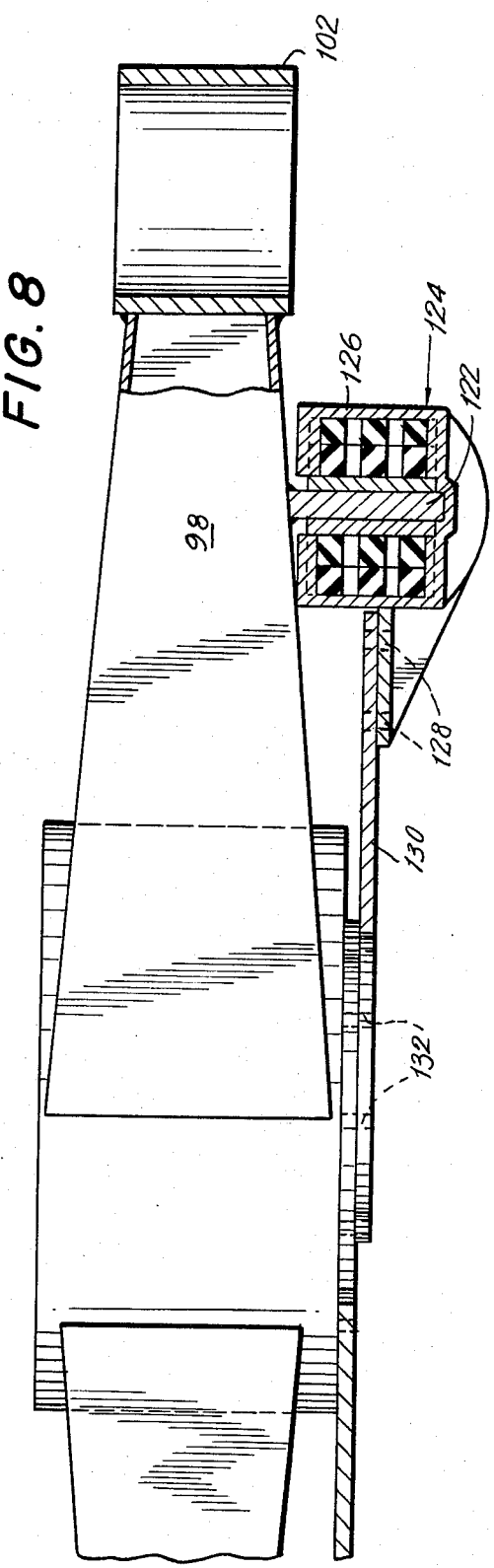

INTERMODAL TRANSPORT SYSTEM

This application is a continuation-in-part of my co-pending U.S. patent applications Ser. No. 032,867, filed Apr. 24, 1979 and entitled "ENERGY SAVING COMBINED RAIL AND ROAD SUSPENSION SYSTEM", now abandoned, Ser. No. 072,072, filed Sept. 4, 1979 and entitled "RAIL AND HIGHWAY TRANSPORTATION SYSTEM", now abandoned, and Ser. No. 143,354, filed Apr. 14, 1980 and entitled "IMPROVED RAIL/HIGHWAY TRANSPORTATION SYSTEM", now abandoned. A primary purpose of the present application is to present within a single patent application the concepts, inventions and thoughts heretofore contained in prior patent applications, but not definitely and succinctly set forth in a form satisfactory to myself or the Examiners responsible for handling my prior related applications.

The present invention relates generally to the field of intermodal rail-highway transport, and more specifically to an intermodal transport system which is characterized by a remarkably significant economic advantage over known or conventional transportation systems.

As will be seen from the following, the present invention and its many facets contemplate a truly novel and significant teaching of economy in the transportation of semi-trailer containers by means of rail and highway. Quite apart from the novel method employed, the suspension structures and system "hardware" provide a novel and patentable combination for serious consideration to the industry.

The form of the present specification has been tailored to provide the reader not only with a conventional approach of fully describing the annexed drawings by means of proper reference characters, but additional information is herein provided in order to enable the reader to fully appreciate the potential impact of the novel intermodal transport system described herein upon the U.S. economy and transportation-associated energy consumption within this country. Rather than burden this specification with yet further detailed information that has already been documented, I shall make available to the reader documented data supported by appropriate affidavit papers that will yet further provide evidence of the improved economy afforded according to the present invention, and technical data that will give the statistics that are the basis of the claims being made herein.

An object of the present invention is to provide a novel intermodal transport system capable of utilizing relatively low-profile rail car technology and providing for the transportation of semi-trailer containers by rail.

Another object is to provide an intermodal transport system in which a major and principal purpose is to provide economic and energy savings that have significant potential impact upon the U.S. economy and the energy consumed within our nation.

A further object is to provide such an intermodal transport system wherein, unlike conventional intermodal systems in which there is a tendency to complicate the means of interchange between highway and rail, significant savings in the unit cost per ton per mile per percent of grade per hour per dollar, are realized by means of true measurements of the productivity of surface transport.

Yet a further object is to provide an intermodal transport system which will actually enlarge the industrial market for the intermodal transportation of trailer containers via providing means for reducing the costs of services through direct savings in (1) energy consumed during rail line haul, (2) investments required for both rail support means for the highway trailers thus moved by rail and the interchange terminal space provided for the supply of rail support means, and (3) maintenance costs associated with the rail support means provided according to the present invention and described in detail below, as compared with transporting trailers or containers upon conventional flat cars.

Still another object of this invention is to provide an intermodal transport system with a terminal interchange wherein the lengths of supply track required per trailer moved by rail for the rail support trucks described in detail below is actually less than 10% of the supply track lengths now utilized per trailers shipped upon flat cars.

Yet another object of my invention is to provide an intermodal transport system capable of operating anywhere within the country within the unrestricted main rail line clearances of 8' widths and 15' heights above rails, as opposed to the flat car operation requirements of an overhead clearance of 17' above these rails, such that the present system will be capable of operating through Conrail tunnels under the Hudson and East Rivers between Jersey City, Manhattan and Long Island where the clearances are approximately 14', 4".

Yet another object of the present invention is to provide such an intermodal transport system which affords an unbelievable 80% weight saving per trailer line hauled by rail, over the present known or conventional rail support means. More specifically, a reduction from the 65,000 pound flat car to a 13,000 pound suspension means described in detail below utilized for two rail support trucks to carry the same two trailers as a flat car is demonstrated.

Still a further object is to provide an intermodal transport system wherein the energy consumed by utilizing the present invention for rail line haul of trailer containers is an incredible 45% less than that now required by prevailing piggyback-type operations.

Yet a further object of the present invention is to provide an intermodal transport system wherein the rail support means per trailer moved according to the present invention is but 20% of the cost paid within the United States for flat cars, per trailer moved.

A further object is to provide an intermodal transport system wherein the use of the 1879 model jaw coupler still used in flat cars now moving trailers is no longer necessary, and wherein the novel rail support means which couple the ends of trailers according to the present invention further provides slack for starting the train, while buffing shocks are absorbed by gravity, and torsional strains in both the rail support trucks and their respective sprung masses are prevented by the novel structure to be described below.

Still a further object of the present invention is to provide an intermodal transport system wherein standard horizontally engageable depending kingpins integral with all trailers, and useable with highway tractor locking fifth wheels are provided in addition to a vertical engagement of a relatively massive kingpin extending vertically above the rail support trucks according to the present invention matingly engage inset female receptacles below the floor of the highway trailers in order to enable engagement for rail line haul.

Still a further object is to provide a novel intermodal transport system with an alternate interchange between highway and rail by utilizing an adjacent trailer parking space wherein a train makeup track and a paralleling supply track for rail support trucks are both served by a relatively simple, interconnecting elevating shuttle extending substantially 90° with respect to each, and which interchange further includes a power jack in the train makeup track adjacent this shuttle. A yard mule equipped with a standard Bartlett elevating fifth wheel moves the trailer between the parking and makeup track shuttle over a highway surface flush with the tops of the rails.

Before turning to the drawings and the description of the hardware and structure utilized according to the present invention, perhaps a brief summary of some of the major considerations to be taken into account by the reader insofar as intermodal transport is concerned is worth setting forth here. The following will give the reader who may be unfamiliar with some of the conventional problems associated with intermodal transport an appreciation of the background of the present invention.

It becomes obvious now that the only or perhaps a major source of new revenue for rail transport appears to be from an improvement in the economy of rail line haul due to the growing volume of truck loaded freight and containers. As will be seen from this description of my invention, a new intermodal transport system enables the transportation of highway trailers and containers by rail without the use of heavy flat cars.

With the present invention, the primary rail function in a national transportation pattern will be the line haul from a single origin track to a single destination track, with cargo trains from a single shipper to a single consignee. Utilizing a system interchange between highway and rail according to the present invention, space would preferably be leased from the railroad (by one or more parties utilizing the system) who would own and operate the system itself. Shippers would drop and pick up their system trailers at the interchange parking lot and would, respectively, receive them at a destination interchange parking lot in the same condition, namely with the support wheels down, the rear bumper up and latched. The time required to make up (or break up) a 30 trailer train at a cross transfer system interchange would not exceed 90 minutes, leaving 21 hours on a highway-to-highway basis for 1050 miles (calculated at an average rail speed of 50 miles per hour) within the first 24 hours; 2250 miles in 48 hours; and 3450 in 72 hrs.

Principal economy features of my intermodal transport system include no less than the following: (1) 16 tons of less weight of rail conveyance per trailer than now realized using conventional piggyback modes, (2) reduction by 46% of the energy of rail line haul, (3) reductions in capital investment in rail conveyances by in excess of 80%, and (4) reductions in maintenance costs of rail conveyances by at least 82%.

As will be seen in more detail below, major components of my intermodal transport system include a container trailer having a downwardly extending tractor kingpin at one end, and a female receptacle located beneath the floor at each longitudinal end for cooperative connection with an upstanding kingpin associated with a rail support truck according to the present invention. The system further includes a rail support truck with a link suspended bolster integral with a kingpin extending vertically therefrom, for engagement with a female receptacle in adjacent trailers to be formed in a train formation, a highway trailer parking space, a train makeup track, a rail truck supply track parallel to the train makeup track, a shuttle with elevating features for transfer of rail trucks between the train makeup track and the supply track, a powered jack utilized to raise the trailer support props in the train makeup line beyond the shuttle as it relates to the parking space, and a yard mule for transfer of the container trailers between the parking space and the through shuttle in the train makeup track.

At this point in this specification, it would be best to refer to the drawings in order to give the reader a better appreciation of the system prior to completing the description of the system's advantages. This description of the items depicted in the drawings will further give the reader an appreciation of how my intermodal transport system overcomes the disadvantages of prior art problems and how it accomplishes the partial list of objects set forth above.

For a further understanding of the present invention, reference may be had to the accompanying drawings wherein similar reference characters denote similar elements and structures throughout the several views, and in which:

FIG. 3 is a partial fragmentary sectional elevational view of a rail coupler truck according to the present invention;

FIG. 7 is an enlarged partial fragmentary sectional elevational view of a friction damper utilized with the intermodal transport system of the present invention;

Figure 1:
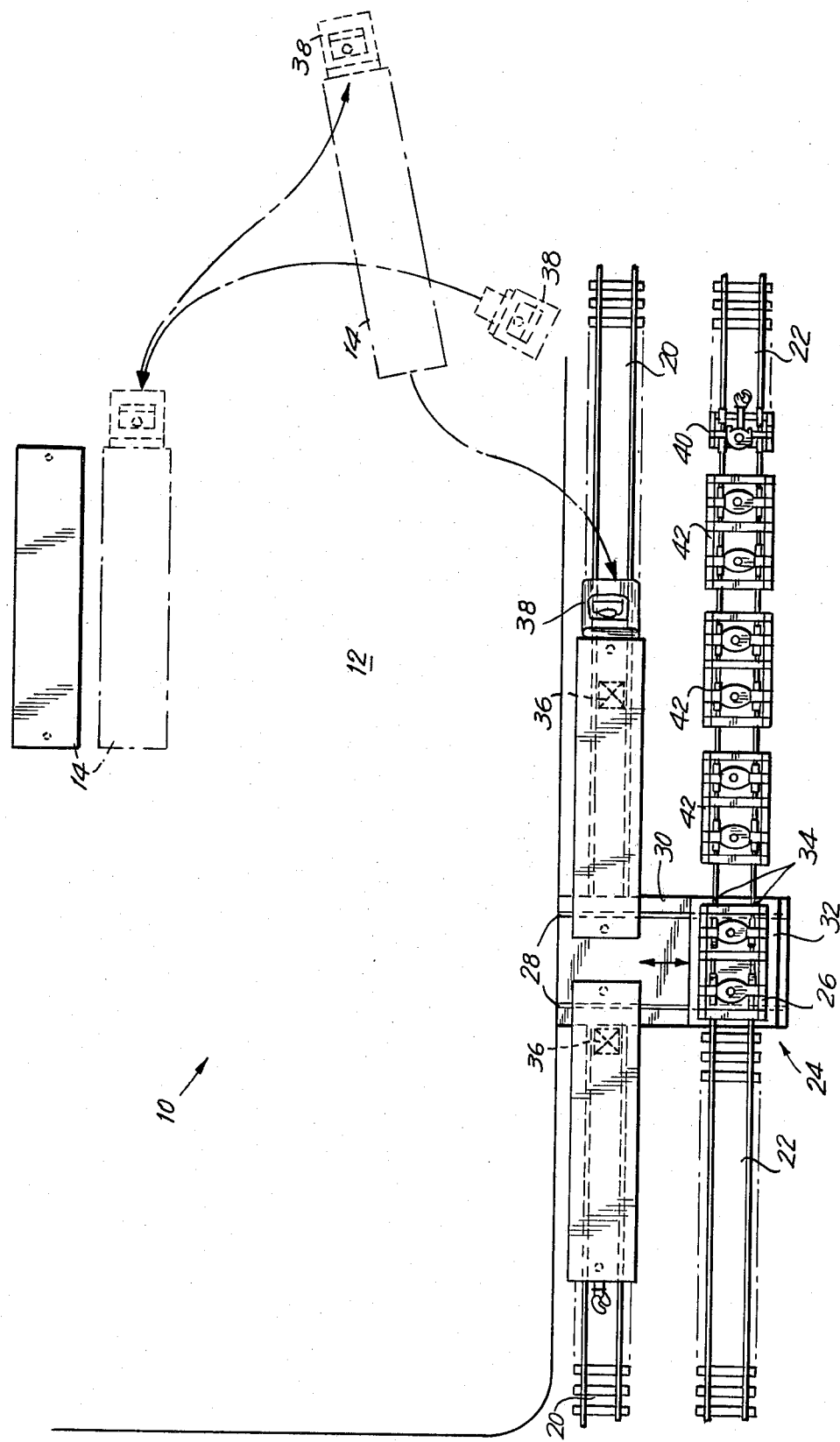
FIG. 1 is a partial schematic plan view of an intermodal transport system interchange according to the present invention.

FIG. 8 is a fragmentary partial top plan view of the friction damping means of FIG. 7; and Referring now in more detail to the drawings, FIG. 1 in schematic form illustrates components of the intermodal transport system according to the present invention by designating the system with reference character 10. An interchange of the system is shown within FIG. 1, wherein the actual interchange between highway and rail takes place by means of the different supporting means for the trailer or container on each respective surface. On the highway, the trailer or container is normally supported at its rear by an integral highway bogie, and at its nose by a horizontally engageable downwardly extending trailer kingpin which operationally cooperates with a tractor locking fifth wheel. The interconnection between this fifth wheel and the trailer kingpin occurs by horizontal relative movement between these components.

On the rails, each end of the trailer is supported according to the present invention on a centerplate of a rail support truck, either of the coupler type for connection at the train ends with a locomotive or a caboose, or one interconnecting adjacent ends of two trailers in a train. As will be seen below, the centerplate is integral with a massive upstanding kingpin which vertically engages with a female receptacle below the floor of the trailer or container, in the center sill of the trailer, as the highway bogie is raised clear above the rails.

Figure 2:
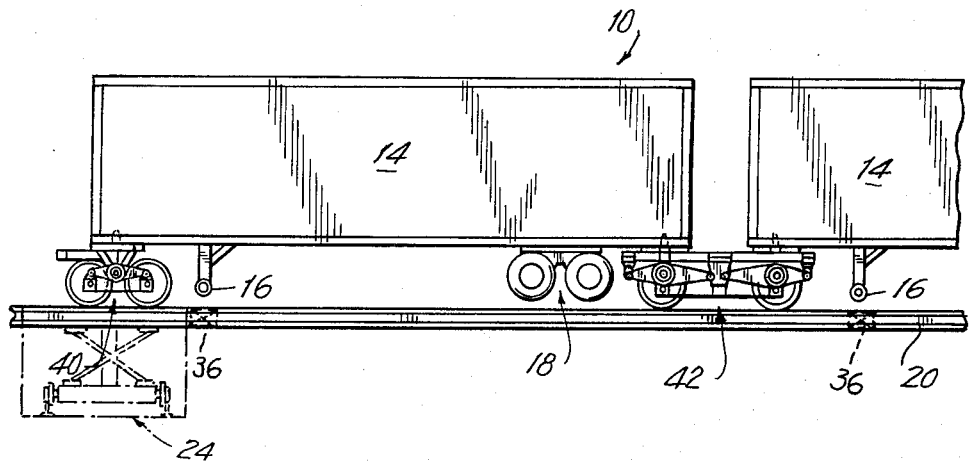
FIG. 2 is a partial fragmentary reduced-scale elevational view illustrating the rail support means used in conjunction with trailer containers according to the present invention.

Referring to the interchange itself, a parking lot 12 is used for system trailers exclusively, wherein one or more of the trailers 14 for rail line haul are parked in a marked space by a driver who winds down the support wheels 16 and raises and latches the rear bumper in an up position. FIG. 2 illustrates the positions of the integral highway bogie 18 and the support wheels 16.

The trailer parking lot of my system 10 extends flush with the top of the rails of a train makeup/breakup track 20 over which the trains of trailers depart and arrive from and at the system interchange being described for FIG. 1. A supply track 22 extends parallel with respect to the makeup/breakup track 20 and serves as a means of storage and supply of rail support trucks of either the coupler or interconnecting type.

A cross transfer or shuttle 24 extends 90° between the parallel rail tracks 20 and 22 and includes a shuttle car 26 which may ride upon shuttle tracks 28 or tires, as the case may be, within a well 30 extending between tracks 20 and 22. Shuttle car 26 includes elevating means of the hydraulic type which have been designated reference character 32 in general and which serve to raise and lower shuttle truck support tracks 34.

A jack 36 preferably powered by hydraulic means is located within the makeup/breakup track 20 to the side of shuttle 24 and serves to support the nose of each trailer 14 in a train makeup by contact under the trailer support wheels 16 while a yard mule 38 which has brought a trailer or container 14 to the makeup/breakup track 20 is uncoupled in a friction-free manner. The support of the trailer 14 by jack 36 occurs not only while the yard mule 38 is uncoupled, but during the time that a rail support truck is shuttled by means of shuttle 24 from the supply track 22 to the makeup/breakup track 20. In operation, the shuttle in making up a train starts with its tracks 34 in alignment and flush with supply track 22, whereupon either a coupler truck 40 or an interconnecting truck 42 is moved upon rails 34. Rails 34 are then lowered by means of elevating means 32 and the shuttle car 26 moves under makeup/breakup track 20 until in alignment therewith, whereupon the elevating means raises tracks 34 into alignment and flush with track 20 whereupon the truck kingpins engage receptacles in trailers 14 held by jack 36, the latter thereupon being lowered. The lowering of the elevating means 32 occurs as the shuttle car 26 leaves the supply track and the lowering approximates 14" in order to enable vertical engagement of its vertically upstanding kingpin from below the trailer now at highway level. This affords 5" of kingpin height with 4" of highway tire clearance over the rails (as best seen in FIG. 2) with 2" of trailer spring deflection and 1" of trailer tire reflection unloaded.

The operation described above is simply reversed for the case of a train breakup as opposed to train makeup being described for FIG. 1.

I would like now to give the reader an appreciation of the specific suspension systems utilized for the rail support means, namely the rail coupler truck 40 and the rail interconnecting truck 42. FIG. 3 illustrates by sectional elevational view rail coupler truck 40 in which a pair of axles 44 extend transversely with respect to the parallel spaced rails 20, for example. Flanges wheels 46 are mounted at opposite ends of each of these axles 44 so that the flange of the wheels 46 rides along the inner side of the respective rails. At each end, each of the axles 44 is rotatably journaled within journal boxes 48.

A torque reactive suspension means 50 is located at opposite lateral sides of the rail coupler truck 40. This torque reactive suspension means 50 is of a type similar to that disclosed in my U.S. Pat. No. 3,171,668, but differs in a number of respects, and serves to isolate rail-induced excitations from the sprung mass.

In the suspension means, opposing torque arms 52 and 54 are interconnected through an elastomeric bushing 56 which is adhered to or compressively arranged within a hub 58 and a collar 60. Torque arm 52 is affixed by bolts to hub 58 by fastening means such as bolts, while opposing torque arm 54 is affixed by welding to or integral by casting with the collar 60. Alternatively, torque arm 54 may comprise separate pieces affixed to collar 60. A second bushing 68 is bonded on shaft tube 66. Bolt flange hub 58 is pressed over key fins or bushing 68. Bushing 56 is bonded on hub 58 while collar 60 is pressed over key fins on bushing 56.

These bushings 56 and 68 are preferably formed of elastomeric material such as rubber and are of an infinite length. This material has been found to provide exceptionally long service life in torque reactive suspension systems and the lives of torsionally stressed bonded rubber suspensions have been found to average approximately 20 years with extremely low failure rates. Thus, the low service costs associated with the bonded rubber torque reactive suspension means substantially outweighs any increased costs relative to conventional steel coil springs.

The inner sleeve 66 that has been described above is connected to the bolster 64 is affixed to the torque reactive suspension means through the inner bushing 68. This suspension means 50 effectively isolates the three basic modes of excitation which occur in railroad transportation—to wit: transverse forces, horizontal forces and longitudinal forces. Vertical forces are isolated by torsional shear forces which act in the bushings 56 and 68. Transverse forces are resisted by both axial shear and cornering resistance, also in the elastomeric bushings. Finally, horizontal forces such as may occur during braking of the train are resisted by radial deflections in the elastomeric bushings.

What will be described herein as a centerplate 70 is integral with bolster 64 and includes an upstanding kingpin 72 held integral therewith and extending upwardly vertically therefrom. When assembled or constructed, kingpin 72, centerplate 70 and bolster 64 comprise a unitary construction. The rail kingpin 72 and the load supported by centerplate 70 is supported in offset fashion at an elevation above shaft tube 66 and suspension means 50 such that the load supported by the centerplate is taken up by the suspension means. A conventional railroad jaw coupler 74 extends longitudinally from and relatively horizontally with respect to bolster 64 by means of member 76. This jaw coupler allows engagement of the rail coupler bogie or truck 40 to another coupler truck, a locomotive, a caboose, or any other rail-supported vehicle having a similar coupling unit.

Brackets 78 extend vertically from each of the journal boxes 48 and hingedly connects the rubber bushed ends of the opposing torque arms 52 and 54.

Figure 5:
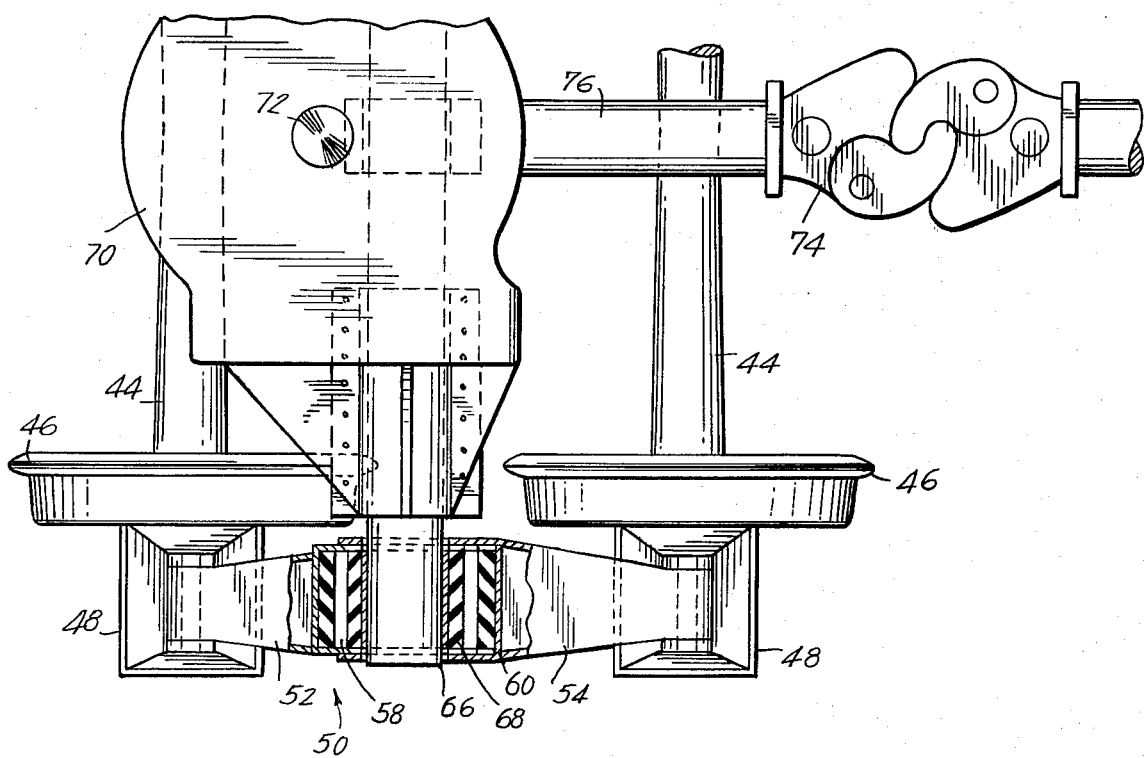
FIG. 5 is a partial top plan view of the coupler truck of FIG. 3.

A leaf spring 82 is secured to the bottom of the pair of journal boxes 48 and serves to define a fixed wheel base between ends of the pair of transverse axles 44. The leaf spring 82 is affixed to the bottom of the journal boxes by affixing the spring eyes to the bottom portion of each journal box which is furthermost from the opposing journal box. The present invention contemplates leaf spring 82 being further secured to the journal boxes by utilizing bolts located at the inner bottom portions of these same journal boxes 48, although not specifically shown within FIG. 3. FIG. 5 represents a top plan view of what has already been described for FIG. 3.

It should be emphasized that the leaf spring 82 associated with coupler truck 40 preserves parallelism, while yet allowing vertical freedom. The vertical deflections of the sprung mass are dampened by means of the elastomeric suspension means.

Figure 4:
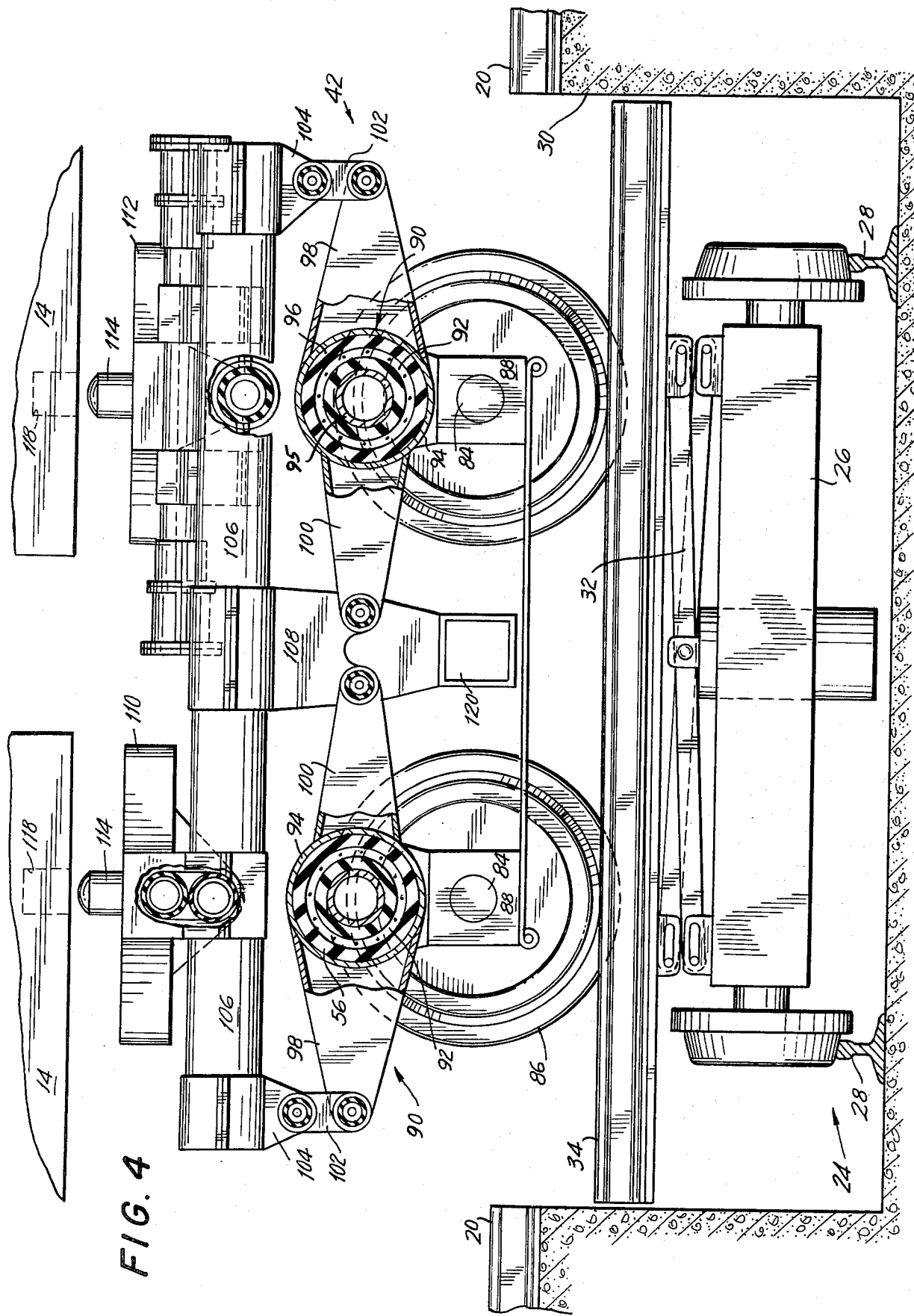
FIG. 4 is a partial fragmentary sectional elevational view of a rail trailer truck on a shuttle according to the present invention.
Figure 6:
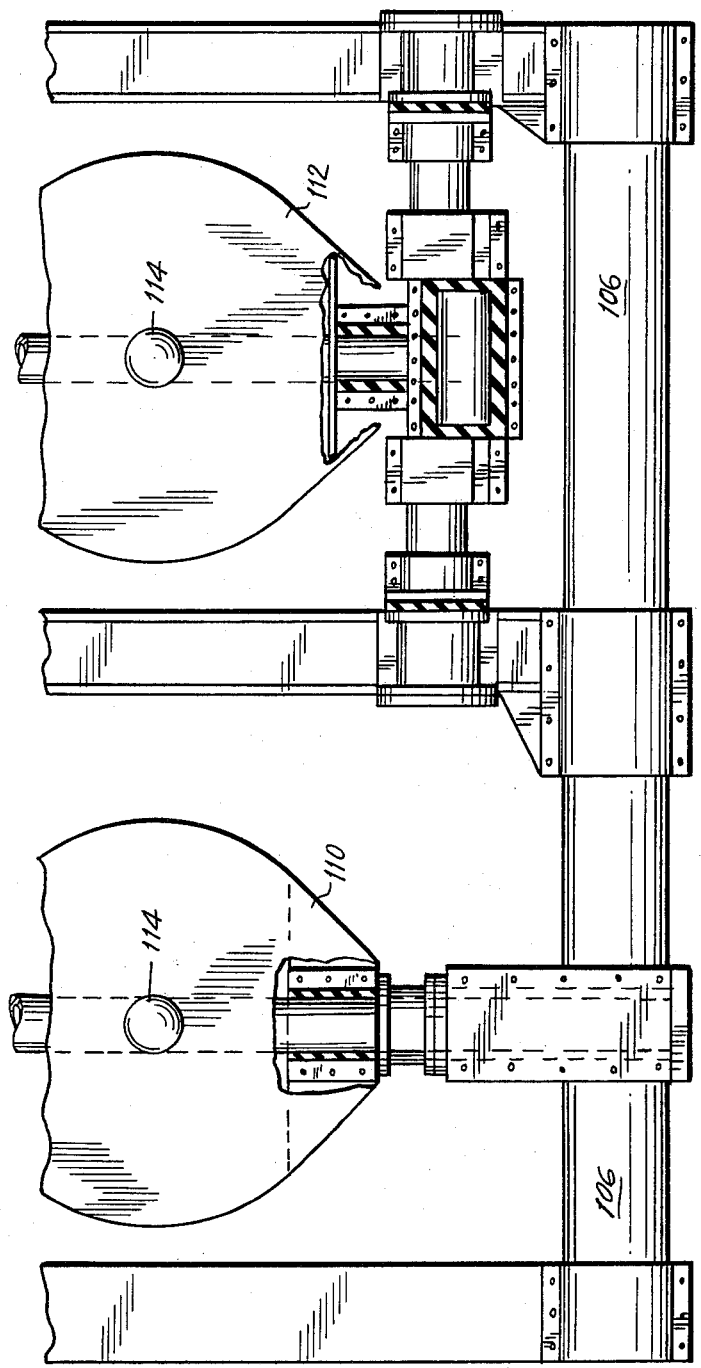
FIG. 6 is a partial top plan view of the rail trailer truck of FIG. 4, showing the relative disposition of the link suspension of the respective centerplates to provide torsion-free support for the adjacent trailers, and for each rail support truck, as required to distribute sprung load over all wheels of car truck.

Turning now to what I have referred to as an interconnecting or rail trailer truck 42, which will also herein be referred to as a rail trailer truck 42, we turn to FIG. 4 which is a fragmentary sectional elevational view of the rail trailer truck sitting atop the rails 34 of the shuttle 24. Truck 42 includes a pair of axles 84 which are spaced transversely with respect to the rails on which flanged wheels 86 and associated journal boxes 88 at each end of the axles 84 normally ride. A torque-responsive and torque-reactive suspension means 90 is mounted above each of the journal boxes 88 and each of the suspension means comprises a hub 92, a collar 94 spaced from hub 92, and a torque-reactive bushing 96 which interconnects the hub 92 and collar 94. Shaft tube 95 of suspension 42 (FIG. 4) is clamped to journal box 88 by integral bracket 97. As has been described for coupler truck 40 above, bushing 96 is preferably of an elastomeric material and interconnects the hub and collar by bonding or other compressive arrangements known to me.

A pair of torque arms 98 and 100 extend relatively longitudinally from the torque-reactive suspension means 90. These arms are mounted to the hub and collar of the torque-reactive suspension means as described above for coupler truck 40.

As seen in FIG. 4, torque arm 98 is connected to the collar 94 and extends outwardly toward a longitudinal end of the rail trailer truck 42. Arm 98 is connected through a link or shackle 102 to an end bracket 104 which depends from one end of a bolster 106. Torque arm 100 is connected to the hub 92 and extends inwardly to a second bracket 108 which depends from a longitudinal mid-portion of bolster 106. Arms 98 and 100 are mounted to the brackets so that the arms can pivot freely at the respective brackets 104 and 108.

A pair of centerplates 110 and 112 which provide vertical as opposed to horizontal engagements as will be described in more detail below, are longitudinally disposed along bolster 106 such that a pair of upstanding kingpins 114 associated with and integral with each of these centerplates 110 and 112 substantially coincides and overlies the suspension means 90.

Suitable stabilizing means are provided with each centerplate 110 and 112 and, thus, the leftmost kingpin 114 is able to vertically engage a receptacle 118 disposed beneath the floor of container 14 and thus will support the rear end of this container, while the rightmost kingpin will support the forward end of a following container 14 disposed in a train formation or line. Train air brakes may be either of the disc type or the conventional shoe contacting wheel tread.

It should be noted here that the trailers or containers have fixed wheel support means (for highway) as opposed to slider bases that have now been made unnecessary by means of the present invention.

Thus, the rear of one trailer 14 and the nose of an adjacent trailer 14 in a train are interconnected by a rail trailer truck 42 comprising its two axles (each with air disc brakes) with a separate spring means mounted directly over each roller bearing journal box 88. A cross bolster 106 supports two separately link suspended centerplates 110 and 112, each with an integral vertically extending kingpin 114 centered therein. A first centerplate suspended on links affords longitudinal freedom of trailer movement within the arcuate path of its links, to gravity cushion buffing shocks and provide slack for starting train (supporting the rear of one trailer). The second centerplate on links (disposed at 90 degrees to above) affords transverse movement within the arcuate path of a center disposed above the center of gravity of the sprung mass, and supports the nose of the next adjacent trailer in a train. Thus each trailer, and the supporting rail trailer truck, are link-suspended free from torsional stress and from buffing shocks.

I now wish to direct the reader's attention to what I believe to be novel means of dampening undesirable excitations and vibrations as between the axles and the frame of the suspension. More specifically, the present invention contemplates friction dampening of the vertical impacts upon the sprung mass of the suspension system (as opposed to hydraulic dampening as is currently used with pneumatic tires), and what will be referred to now is the friction damping of the oppositely oscillating suspension arms, each of which is amply journalled in its own bonded rubber collar which is torsionally stressed. Before specifically referring to FIGS. 7 and 8, it is emphasized here that this invention contemplates two types of friction dampening means, one of which will be described here before referring to the other shown in the drawings. A dampening cam fin is secured such as by welding to a suspension torque arm which cooperatively bears against damping means interconnected with its opposing counter-oscillating torque arm in order to dampen by frictional resistance any relative movement between the opposing arms, rather than as between the arms and the sprung mass where dampening would normally be effective to the extent of one-half of that as between the counter-oscillating arms. The dampening cam fin bears against what will be herein referred to as a friction shoe which is pressured against the plate by a series of several relatively small cross-sectioned, long rubber bars compressed radially and contained within a shoe housing which is, in turn, secured by bolts to a plate bolted to the inner hub of suspension means.

The dampening fin is preferably tapered and extends transversely with respect to the torque arm. The effect of the rubber bars backing up the friction shoe is to provide spring-type pressure against the tapering thickness of the fin such that the counter-movement as between the plate and the shoe causes load increases and resulting friction dampening.

It is very important here for me to emphasize that the present invention contemplates reversing the attachment of the dampening fin and the opposing shoe such that the fin may be connected to the inner hub and the shoe connected to the torque arm without departing from the spirit of the present invention. I wish to emphasize here that the dampening means shown in FIGS. 7 and 8 are not absolutely necessary for the present invention to perform satisfactorily and this friction dampening means should be viewed as an optional feature of the present invention, not a necessary limitation. Both gravity and friction damping are afforded by the links suspending the centerplates from the bolster, aside from the supplemental friction damping referred to above.

For purposes of further describing preferable embodiments of the friction dampening means contemplated by the present invention, I wish here to affirm that my invention is capable of incorporating a bolt plate secured to the suspension hub, outwardly of the bolted arm secured to this hub, and extending oppositely with respect to the bolted arm such that it terminates in an arcuate-shaped outline form of friction plate. This friction plate increases in thickness as one looks from the bottom of the plate to the top of the plate, such that the top of the plate is thicker than the bottom cross-section. Friction shoes which are spring-biased are carried in a bracket bolted to the opposing suspension arm from that just mentioned, and press against both sides of the friction plate, increasing the frictional dampening as the sprung mass deflects.

This is best illustrated in FIGS. 7 and 8, wherein the oppositely extending arms 98 and 100 extend outwardly from this hub. In the case of arm 98, it extends outwardly to shackle 102. In FIG. 7 and likewise in FIG. 8, the arcuate outline friction plate has been designated reference character 122, with the friction shoe assembly 124 including this bracket 126 secured by means of bolt 128 to the plate 130 which, in turn, is secured by means of bolt 132 to said arm.

We thus see that the present invention provides the user with an intermodal transport system capable of use with relatively low-profile rail car technology and which is capable of use with a plurality of semi trailers or containers having vertically extending receptacle insert means disposed below the floor of each near each opposite end thereof for cooperative mating engagement with the rail support means in the form of either a coupler truck or an interconnecting or trailer rail truck. The novel interchange described above provides for unconfusing transfer as between highway and rail, without the nightmare of possible union problems where responsibilities of either highway or rail personnel overlap.

I wish now to turn to the manner of operation with which the interchange and the system according to the present invention actually will operate. In operation, a yard mule 38 progresses to and picks up a first trailer 14 situated within the parking lot at a parking space and backs it over the highway-rail-surface level until the trailer bogie tires associated with the trailer 14 are just short of the gap in the rails of the makeup track 20. This gap is filled as the shuttle elevator 32 moves from the parallel supply track 22 first with a rail coupler truck 40 which will enable coupling to a locomotive or a caboose at either end of the train. As the shuttle 24 leaves the supply track 22 at the same level of the makeup track, the shuttle elevator or elevating means 32 lowers the rail coupler truck approximately 14" to enable vertical engagement of its vertically upstanding kingpin from below the trailer which while it is sitting at highway-rail elevation enables a 5" kingpin height. This also will facilitate a clearance of 4" of highway tire clearance over the rails, allowing for 2" of trailer spring deflection, 1" of trailer tire reflection in an unloaded state, and 2" of deflection of the rail support truck springs which are at this moment in time of the operation in a free state.

I pause here in this description to emphasize that at this stage of the interchange operation, the highway support means is disengaged horizontally while the rail support means is engaged vertically. This provides for no possible chance of confusion.

Continuing on with the description of the operation, the shuttle car 24 will stop automatically as its approximately 10' rail section or truck support track 34 supported over the elevating means 32 comes into alignment with the rails of makeup track 20. The elevator 32 raises the rail coupler truck approximately 5" until first contact is experienced between the centerplate and the face of the trailer bottom support plate at the female receptacle that will receive the kingpin of the rail coupler truck. The elevating means 32 continues upwardly as the trailer weight concentrated in the rear is transferred to the rail coupler truck, and thereafter further until the trailer tires are 4" above the rail.

At this point in the operation, the yard mule 38 backs this first trailer to a position where its drop support wheels 16 are disposed over a power jack 36, which serves only to hold the nose of the trailer at a height which allows the yard mule 38 to disconnect with but a small amount of friction at its fifth wheel (the first trailer is now free to roll, supported on its rail coupler truck). With the load of the trailer at the trailer at the trailer's nose now on this power jack 36, the yard mule 38 unlocks the tractor fifth wheel from the trailer kingpin and horizontally withdraws to a parking space to bring a second trailer to the train makeup.

The shuttle elevating means 32 now moves to the supply track 22 and a first rail trailer truck 42 is rolled onto the tracks 34. Now as the shuttle 24 moves toward the makeup track 20, the elevator lowers this first rail trailer truck approximately 14" so that it will pass below the second trailer that is now being shuttled by means of the yard mule at 90° with respect to the makeup track. As the yard mule stops the second trailer with its highway bogie tires just short of the shuttle well 30 in which the shuttle-elevator operates, the rear of the second trailer 14 and the nose of the first trailer described above are aligned for engagement of the two massive kingpins 114 that are upstanding on the separate centerplates 110 and 112 of the first rail trailer truck 42. This first trailer truck 42 is then raised by the shuttle elevator 32, with vertical engagement starting at the rear of the second trailer and continuing until the first trailer nose load is on the first rail trailer truck. The power jack 38 is lowered, and the yard mule is thereafter free to now back both first and second trailers along the makeup track for the drop supports of the second trailer to rest on the power jack.

This cycle that has just been described for the first two trailers represents a cycle that is complete. The operation is reversed at the train breakup.

Finally, it should be understood by the reader that the interchange according to the present invention may also be effected at present piggyback rail terminals, where a trailer is dropped alongside of the train makeup track, and where cranes which straddle both the roadway and the parallel rail track, life the trailer and move it transversely above the rail and thereafter lower the trailer downwardly onto a rail support truck. It is a question of economy and jurisdiction (taking into account representatives of labor forces) which has prompted the present invention of a novel cross transfer interchange as is disclosed within this application.

In conclusion, rather than burden the present specification with yet further summaries of data and statements that affect the economy which is novel with the present invention, as well as the technological improvements herein presented, simultaneously with the filing of the present application my technical report affecting the economy of low-profile car technology in intermodel transport of trailers and containers is annexed to a preliminary amendment and which I will support by affidavit upon request.

The embodiments of the present invention hereinabove set forth are described are presented merely as examples of my invention. Other embodiments, forms and modifications of the present invention which may suggest themselves to those skilled in the art are contemplated as coming within the scope of the present invention, as defined by the appended claims.

What is claimed is:

1. An intermodel transport system capable of use with relatively low-profile rail car technology and including a plurality of semi-trailer containers having vertically extending receptacle insert means disposed below the floor thereof near each opposite end thereof for cooperative mating engagement with rail means defined below, said system comprising, in combination: a tandem axle rail support truck for supporting adjacent ends of said trailer containers in substantially torsion-free rail train formation, and system terminal interchange means for engaging said trailer containers with highway and rail support means, said rail support truck including a cross bolster therein, suspension spring means for directly supporting said bolster, at least one centerplate in said bolster, and an integral kingpin upstanding substantially vertically with respect to said centerplate for cooperative engagement with said receptacle inset means, a rail support truck including flanged wheels and roller bearing journal boxes on each end of axles thereof, a bolster supported by both of said axles, a load-deflective spring means interconnecting said bolster with the tops of both journal boxes on each transverse side of said truck, far bottom corners of said journal boxes on each trans-verse side being interconnected by a flat leaf spring, and at least one centerplate with an integral upstanding kingpin supported by said bolster, said load-deflective spring means comprising an elastomer bondedly stressed in torsional shear and reacting on oppositely extending torque beams interconnecting said bolster and the top of said journal boxes on each transverse side of said rail support truck, an elastomeric collar bondedly disposed substantially concentrically within said torsionally stressed elastomer and concentrically surrounding an attachabale hub shaft of said spring means, and further including a friction damper comprising an arm extending oppositely from one of said oppositely extending torque beams, and cooperative friction surfaces interposed between said arm and said oppositely extending beam, whereby all three basic modes of rail impact forces including vertical, transverse and horizontal forces, are substantially isolated from said bolster.

* * * * *